United States Patent [19]

Tsuda et al.

[11] 4,283,036

[45] Aug. 11, 1981

[54] POSITION MEMORY FOR AUTOMATICALLY ADJUSTABLE SEAT ASSEMBLIES

[75] Inventors: Hiroshi Tsuda; Hideoki Matsuoka, both of Yokohama, Japan

[73] Assignee: Nissan Motor Company, Limited, Yokohama, Japan

[21] Appl. No.: 946,166

[22] Filed: Sep. 27, 1978

[30] Foreign Application Priority Data

Oct. 12, 1977 [JP] Japan .......................... 52-137101[U]

[51] Int. Cl.³ .............................................. B60M 1/02
[52] U.S. Cl. .................................... 248/429; 297/344
[58] Field of Search ............... 248/429, 430, 419, 420; 300/346, 344

[56] References Cited

U.S. PATENT DOCUMENTS

| | | | |
|---|---|---|---|
| 2,982,335 | 5/1961 | Garvey | 248/419 |
| 2,983,545 | 5/1961 | Garvey et al. | 248/419 |
| 3,072,231 | 1/1963 | Iding | 248/419 |
| 3,105,670 | 10/1963 | Pickles | 248/420 |
| 3,115,328 | 12/1963 | Brown | 248/429 |
| 3,220,762 | 11/1965 | Garvey et al. | 248/419 |
| 3,223,377 | 12/1965 | Robbins | 248/419 |

Primary Examiner—Francis K. Zugel

[57] ABSTRACT

A rotary wheel with a peripheral recess rotates with the adjusting movement of a motor-driven, adjustably movable seat. A manual lever is operable to freely rotate the wheel relative to the seat to an angular rest position, where a contact element of a memory switch engages in the recess of the wheel. When the seat moves back to the initial position after an adjusting movement, the contact element snaps into the recess to open the switch stopping the motor so that the seat automatically resumes the initial position.

9 Claims, 7 Drawing Figures

POSITION MEMORY FOR AUTOMATICALLY ADJUSTABLE SEAT ASSEMBLIES

This invention generally relates to automatically adjustable seat assemblies adapted for automotive vehicles, and especially to position memory system for use with such adjustable seat assemblies for automatically returning a seat member to an initially set position after any adjusting movement thereof.

In several types of adjustable seat assemblies, it is required and practised that the seat member such as a linearly movable seat or a tiltable backrest which has been set to one of the adjusting positions, makes a subsequent adjusting movement, then resuming the initially set adjusting position. The device carrying out this operation may be called a position memory, several types of which are known. However, most of the known position memories are those built in manual seat adjuster mechanisms in which adjusting movement of the seat member is made by operator's hand or the pressure caused by the weight of the seat occupant. Such devices are necessarily of purely mechanical structure.

Current demand is further to apply a position memory also to an automatically adjustable seat assembly which is operated from a hydraulic or electric motor or the like via a transmission mechanism transferring the drive of the motor to the linear or angular movement of a seat support member.

A general object of the invention is therefore to provide a position memory of the type described above which is particularly adapted for a powered seat adjuster mechanism for automatic adjusting movement of the seat assembly.

Another general object of the invention is to provide an automatically adjustable seat assembly in which a seat member set to an initial position can be automatically returned to that position after any adjusting movement thereof.

Another more specific object of the invention is to provide a position memory of the foregoing character for an adjustable seat, particularly a horizontal seat which may be adjusted forwardly and backwardly by means of an adjuster mechanism driven by an electric motor.

Still another object of the invention is to provide a position memory of the foregoing character for an adjustable seat, particularly a seat backrest which may be tilted forwardly and backwardly by means of an adjuster mechanism driven by an electric motor.

A further object of the invention is to provide a position memory of the foregoing character for an adjustable seat, which comprises an electric memory switch which stores the set position assumed by an adjuster mechanism cooperable with the seat assembly, said switch forming part of a control circuit controlling adjusting movement of the seat assembly.

To achieve the aforementioned objects, the invention provides a position memory comprising a rotary disc or wheel member rotatable with the adjusting movement of a seat member and having a recess formed on its periphery. By manually operating a lever, the wheel member can freely rotate relative to the seat member and assumes a rest angular position, whereupon a contact element of a memory switch engages in the recess at the periphery of the disc member.

Other objects and various features and advantages of the invention will be apparent from the following explanation with reference to the accompanying drawings, wherein similar reference numerals designate similar and like parts throughout the several views, and in which.

Figure 1:
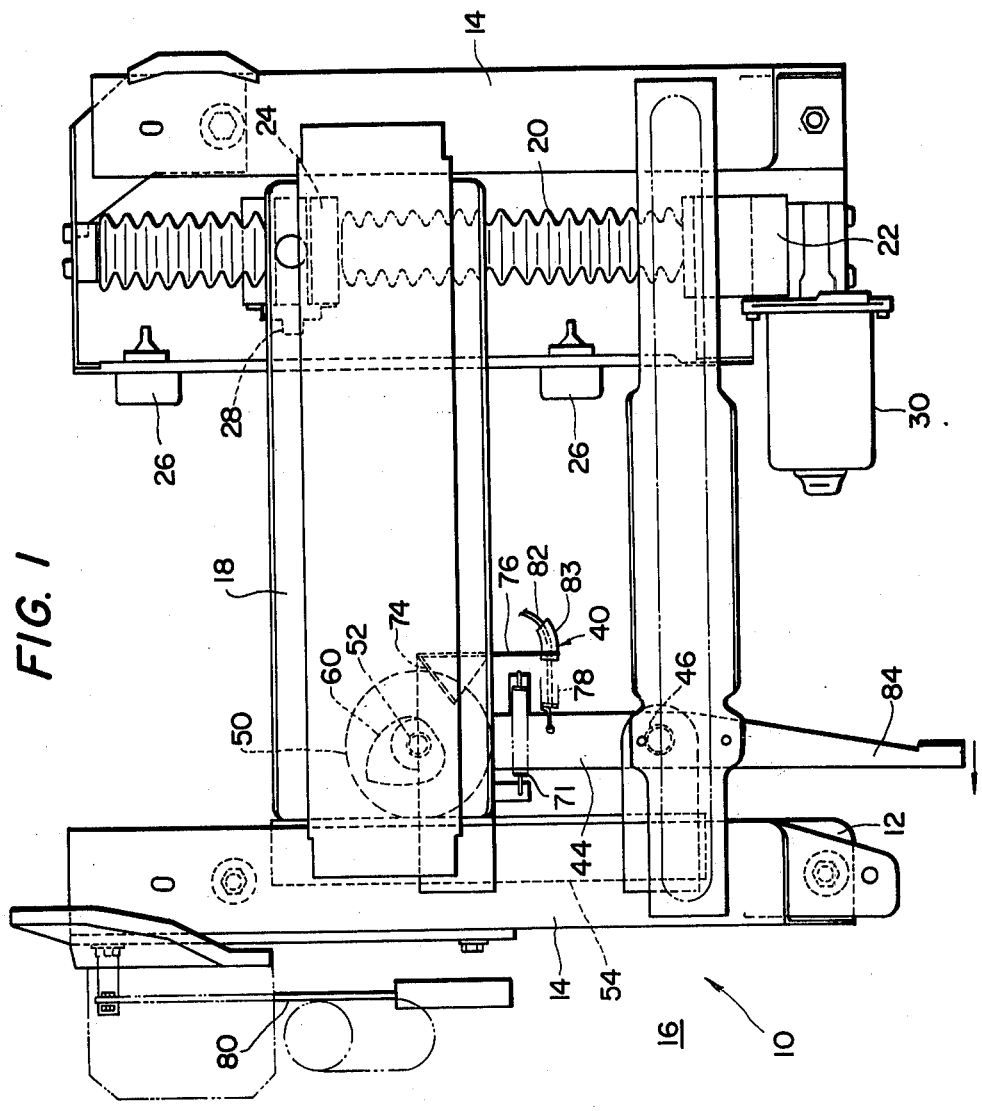
FIG. 1 is a top plan view of the adjustable seat assembly according to a preferred embodiment of the invention.

In the first preferred embodiment, the position memory according to the invention is applied to a horizontal seat which is linearly adjustable back and forth. With particular reference to FIG. 1, generally indicated by 10 is a seat support structure which comprises two spaced parallel low guide rails 12 fixed mounted on a floor 16 or the like (not shown) and two spaced upper slide rails 14 slidably movable along the guide rails 12. The slide rails 14 carry thereon a horizontal seat (not shown in FIG. 1 or 2) for back and forth movements together. The two upper rails 14 are bridged by a transverse member 18 which is at its both ends fixed to the respective slide rails 14. Mounted underside of the transverse member 18 is a worm shaft 20 extending in parallel with the slide rails 14. The worm shaft 20 is driven for rotation from an electric reversible motor 30 by way of a gearing 22 converting the drive of the motor 30 to the rotary motion of the worm shaft 20. The transverse member 18 and the worm shaft 20 are operatively connected together by means of a drive transfer member 24 such as a nut fastened to the transverse member. The rotary motion of the worm shaft 20 is thus converted to linear movement of the transverse member and therefore of the slide rails 14. Two limit switches 26 are spacedly mounted on a longitudinal member (no numeral) movable with the slide rails 14. The back and forth movement of the slide rails is thus limited by engagement of the limit switches 26 with a projection 28 formed at the drive transfer member 24.

Figure 2:
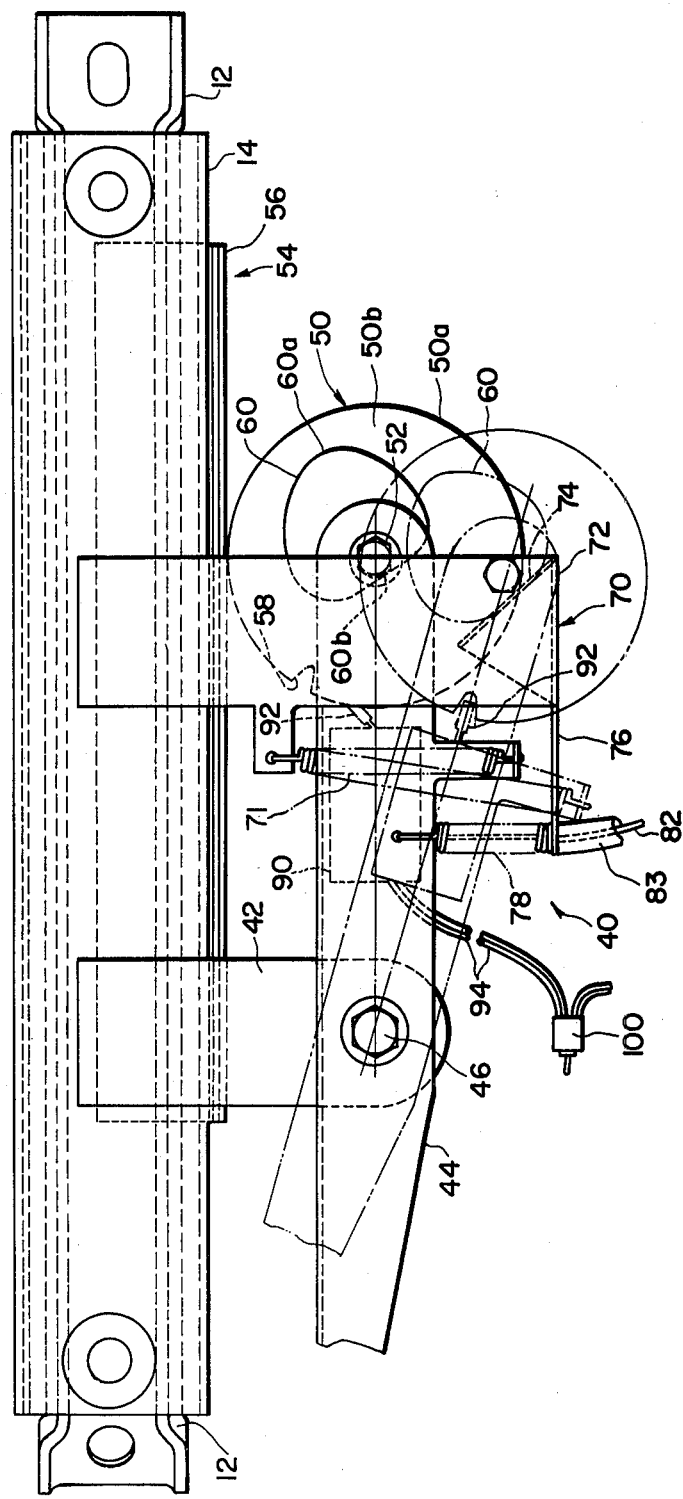
FIG. 2 is a top plan view illustrating in an enlarged scale a position memory built in the adjustable seat assembly shown in FIG. 1.

The position memory mechanism generally indicated by numeral 40 is mounted on the assembled guide and slide rails preferably on the side opposite to that provided with the worm shaft 20, as clearly seen in FIG. 2. A bracket 42 for mounting the mechanism is at one end fastened to the upper side of one slide rail 14 and extends laterally inwardly from the slide rail 14. The other, free end of the bracket 42 carries an elongate arm 44 rockably mounted on a pivot pin 46.

The arm 44 carries at its free end a wheel 50 for free rotation about a pivot pin 52. The wheel 50 is frictionally engageable at its periphery with a friction plate 54 attached on the side surface of one guide rail 12, but being apart from the friction plate by appropriately rocking the arm 44. The arm 44 and the wheel 50 are so arranged that, when the wheel 50 engages the friction plate 54, the line connecting the axes of the two pivot pins 46 and 52 is generally parallel with the slide rails 14. Preferably, a rubber lining 56 is laid on the friction plate 54 to reduce or eliminate slip between the two friction surfaces. Otherwise, the friction plate and the wheel may be toothed to mesh with each other for secure drive transmitting connection, though not illustrated.

The wheel 50 has a cam 60 fixedly mounted somewhat eccentrically on the wheel 50 for united rotational movement with the same. The cam 60 is provided with a lobe 60a and a flat cam surface 60b of the shape and function as will be later described. The wheel 50 further is formed with a small recess 58 at its outer periphery 50a.

Another bracket 70 spaced from the bracket 42 extends in parallel with the latter inwardly beyond the arm 44. A spring 71 has its ends fixed respectively to a tab (no numeral) extending from the bracket 70 and to the arm 44 to bias the latter in counterclockwise direction in FIG. 2.

The bracket 70 has an end plate 72 depending generally at right angle from the free end of the bracket. Extending generally diagonally from one end of the end plate 72 is a plate with a cam mating surface 74 which may be formed merely by bending an extension of the end plate 72 or by joining a separate panel to the end plate 72. The end plate 72 and the cam mating surface 74 are located above the wheel 50 in no contact with the upper surface of the wheel. The end plate 72 further has an extension 76 extending from the opposite end of the end plate 72 substantially in parallel with the rails 14. A light spring 78 is mounted between the arm 44 and the extension 76 to bias the arm in clockwise direction in FIG. 2. The spring 78 may be dispensed with by appropriate choice of the force of the spring 71.

Extending through the spring 78 is an operating cable 82 having one end fixed to the arm 44 and the other end connected with a manually operable lever 80 that will be described just below (FIG. 1). A sheath 83 fastened to the extension 76 preferably encloses the operating cable 82.

The manual lever 80 is mounted on the outboard side of the adjustable seat to allow the seat occupant or operator easy access thereto and may be of any known type, the pivotal movement of which causes pulling the cable 82 to swing the arm 44 in clockwise direction in FIGS. 1 and 2. Another manually operable lever 84 may be integrally attached to the arm 44 (FIG. 1), instead of or together with the lever 80. The lever 84 may be operable from a vehicle rear seat when the memory is installed in a front seat adjuster, as may be desired in two-door type automobiles in which passengers reach the rear seats by displacing the front seats, then they return the front seat to the initial position.

A memory switch 90 of known toggle type, has a body fixedly mounted on the underside of the arm 44 in the vicinity of the wheel 50 and is provided with a contact lever 92 hingedly carried by the switch body for engagement with the recess 58 at the periphery of the wheel 50.

The relative position and arrangement of the aforementioned elements are such that: as soon as any part of the lobe 60a of the cam 60 engages the cam mating surface 74, further swinging movement of the arm 44 causes the cam 60 and therefore the wheel 50 to rotate by a certain angle by way of the surface contact between the lobe and the cam mating surface, until the rest position is reached where the flat cam surface 60b is brought into contact with the cam mating surface so that the wheel 50 no longer rotates. The slant angle of the cam mating surface 74 is appropriately chosen so that, in that rest position, the axes of the pivot pins 46 and 52, lever 92 and recess 58 are in alignment. Thereupon, the lever 92 is snapped into the recess 58 opening the switch 90. When otherwise the lever 92 rides over the periphery 50a of the wheel 50 due to rotation thereof, it tilts in either direction in dependence on rotational direction of the wheel 50 thus closing the switch 90.

The switch 90 is connected through leads 94 with other parts of the electric control circuit 100 for controlling the operation of the adjustable seat that will be fully described.

Figure 3:
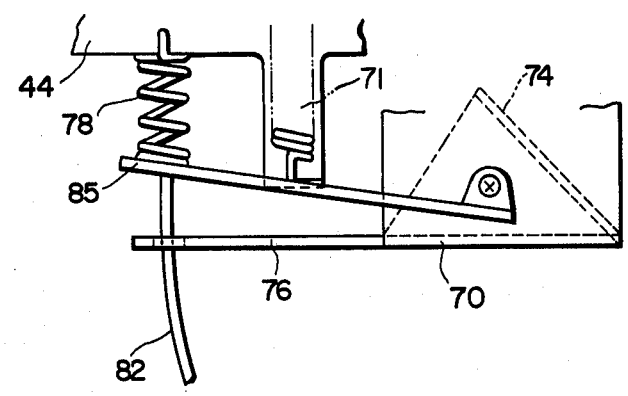
FIG. 3 is a schematic plan view illustrating a slight modification of part of the position memory shown in FIG. 2.

Referring to FIG. 3, the connection between the rocker arm 44 and the operating cable 82 can be modified as illustrated: The operating cable 82 loosely passed through the extension 76 may be fastened to a bar 85 pivotally mounted on the bracket 70, instead of being connected directly to the arm 44. The spring 78 is born between the arm 44 and the bar 85. In this example, the withdrawal of the operating cable 82 and therefore the swing movement of the arm 44 is limited by the bar abutting the extension 76. The pivot angle of the bar 85 should be so determined that the bar abuts the extension as soon as the lobe 60a of the cam engages the cam mating surface 74. The wheel 50 is then rotated by the action of the spring 78 alone exerting on the cam 60 through the arm 44 until the flat cam surface 60b is brought into contact with the cam mating surface 74. This modified example ensures a lighter operation of the manual lever 80 and prevents an excessive load from being applied to the rocker arm.

Figure 4:
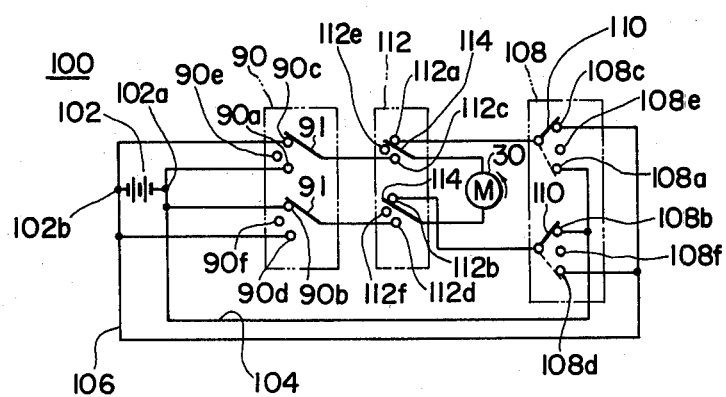
FIG. 4 is a circuit diagram of the electric system employed in the adjustable seat assembly according to the invention.

The circuit arrangement 100 shown in FIG. 4 is now explained below. Represented by 102 is an electric power source, the positive terminal 102a of which is connected with a lead 104 and the negative terminal 102b with a lead 106. The aforementioned memory switch 90 of triple position toggle type comprises two movable contacts 91 which are operatively connected with the lever 92 and two fixed contacts 90a, 90d, respectively connected with the lead 104 and the lead 16. Engagement of the movable contacts 91 with these fixed contacts represents that the lever 92 engages the periphery 50a of the wheel 50 on one side of the recess 58. Two other fixed contacts 90b, 90c likewise connected respectively with the leads 104, 106 are engaged by the movable contacts 91 to represent that the lever 92 then engages the wheel periphery on the other side beyond the recess 58. Still other two fixed contacts 90e, 90f are free from connection with the circuit so that the circuit is open by engagement of the movable contacts 91 with these contacts.

Another switch 108, which will be referred to as a forward-backward selection switch, similarly consists of two movable contacts 110, and six fixed contacts. The first two contacts 108a, 108d are connected respectively with the leads 104 and 106, and upon engagement with the movable contacts, cause the forward movement of the slide rails. Likewise, the engagement of the movable contacts 110 with the contacts 108b, 108c causes the backward movement of the slide rails. In one preferred example, the movable contacts 110 are constantly biased into contact with the backward contacts 108b, 108c by any suitable means such as a return spring, though not shown.

There is further provided an auto-manual selection switch 112 comprising two movable contacts 114 and six fixed contacts. The movable contacts 114 are connected together by way of the reversible motor 30 previously mentioned. The contacts 112a, 112b are both connected with the movable contacts 110 of the forward-backward selection switch 108. As long as the movable contacts 114 are in engagement with these contacts 112a, 112b, any adjusting movement of the slide rails is enabled by manual switch operation. On the other hand, engagement of the movable contacts 114 with the contacts 112c, 112d commands the automatic adjusting movement of the slide rails. The contacts 112c, 112d are connected with the contacts 90c, 90b of the memory switch 90 respectively through the movable contacts 91.

The adjustable seat assembly with position memory, constructed and arranged as above operates in a manner hereinafter described.

When the forward movement of the slide rails is desired, the seat occupant or any other person operates the switch 112 to bring the movable contacts 114 into engagement with the fixed contacts 112a, 112b. Then, the movable contacts 110 of the switch 108 are brought into contact with the fixed contacts 108a 108d against the return spring, as represented by a broken line in FIG. 4. This condition is maintained unless the operator takes his hand off the switch 108. The current from the positive terminal of the power source is thus through a path consisting of lead 104, contact 108a of the forward-backward selection switch 108, contact 112a of the auto-manual selection switch 112, motor 30, contact 112b, contact 108d, and lead 106 to the negative terminal of the power source. The motor 30 is thus rotated in one of the opposite directions. The rotation of the motor 30 is transmitted via the gearing 22 to the worm shaft 20 for revolutional movement thereof, which in turn is converted to the linear forward movement of the transverse member 18 and the slide rails 14 by way of the drive transfer member 24. With this forward movement, the wheel 50 is turned by frictional contact with the friction plate 54 in clockwise direction in FIG. 2. It follows that the lever 92, if received in the recess 58, disengages from it while tilting with respect to the switch body through engagement with the outer periphery 50a of the wheel 50, as represented by a broken line in FIG. 2. When the operator then removes the force or touch from the forward-backward selection switch 108, the movable contacts 110 automatically return to the contacts 108b and 108c. It is preferable to provide a damper means to moderate this returning movement. Also the movable contacts 114 of the switch 112 are changed over to the contacts 112e and 112f. Consequently, the motor is powered off; movement of the slide rail is terminated.

The slide rails thus reach the desired position which is memorized in a manner described below. When the manual lever 80 is turned to pull the operating cable 82 against the spring 72, the arm 44 is swung about the pivot pin 46 in clockwise direction in FIGS. 1 and 2, thereupon the wheel 50 disengages from the friction plate 54 to become freely rotatable relative to the friction plate 54. The cam 60, with the edge of the cam lobe 60a abutting the cam mating surface 74, tends to assume a more stabilized position by virtue of the pulling force exerted on the cable 82 or merely by the load of the spring 78. It follows that the cam 60 together with the wheel 50 is slightly angularly displaced so that the flat cam surface 60b is brought into tight engagement with the cam mating surface 74. In this rest position assumed by the cam 60, as has been previously described, the recess 58 at the wheel 50 aligns with the pivot axes 46, 52 of the arm 44 and wheel 50, so that the lever 92 of the switch 90 is fitted in the recess 58 to connect with the fixed contacts 90e, 90f, thus opening the memory switch 90. When the manual lever 80 is now released, the wheel 50 is again brought into contact with the friction plate 54. In this state, the lever 92 is kept engaged in the recess 58 and the memory action is thus completed.

Further movement of the slide rails from the memory position, for instance, in backward direction, takes place in the following manner. The auto-manual selection switch 112 is changed over to render the movable contacts 114 to engage the manual fixed contacts 112a, 112b. The movable contacts 110 of the forward-backward selection switch 108 are maintained in contact with the backward contacts 108b, 108c by the action of the return spring mentioned above. The current from the positive terminal of the power source flows through a path consisting of the lead 104, contact 108b, contact 112b, motor 30, contact 112a, contact 108c and lead 106 to the negative terminal of the power source. The motor revolves in the opposite direction, hence the slide rails move backward in a manner as is apparent from the foregoing explanation. At the same time, the wheel 50 rotates in counterclockwise direction by frictional contact with the friction plate 54. The lever 92 of the switch 90 then disengages from the recess 58 and is tilted relative to the switch body in a direction opposite to that denoted by a broken line in FIG. 2. This results in that the movable contacts of the switch 90 engage the forward contacts 90a and 90d in FIG. 4. When the slide rails reach the desired backward position, the auto-manual selection switch 112 is opened by engaging the movable contacts 114 with the contacts 112e and 112f.

To resume the memory position, the auto-manual selection switch 112 is changed over to the auto contacts 112c, 112d. The memory switch 90 is kept in position just mentioned above. It follows that the current from the positive terminal is passed through a path consisting of lead 104, contact 90a, contact 112c, motor 30, contact 112d, contact 90d and lead 106 to the negative terminal of the source 102. The motor revolves in said one direction so that the slide rails advance automatically. The wheel 50 is then rotated in clockwise direction. The lever 92 slides along the periphery of the wheel 50 and falls in the recess 58 when they meet together as already described. The memory switch 90 is then rendered open to stop the motor 30. The slide rails are thus maintained in the memory position.

It is, of course, possible to move the slide rails from the memory position further forward instead of backward, then returning them to the memory position. On this occasion, the operator has to keep an operating effort on the switch 108 to force the movable contacts 110 into engagement with the forward contacts 108a, 108d against the return spring throughout further forward movement. It would be apparent that the lever 92 is herein tilted to engage the backward contacts. The switch 108 may be of other types, for instance, such that the movable contacts 110 are resiliently biased toward the fixed contacts 108e, 108f instead of the backward contacts, or that no return spring is provided and the movable contacts can be changed over manually among the three fixed contacts.

Figure 5:
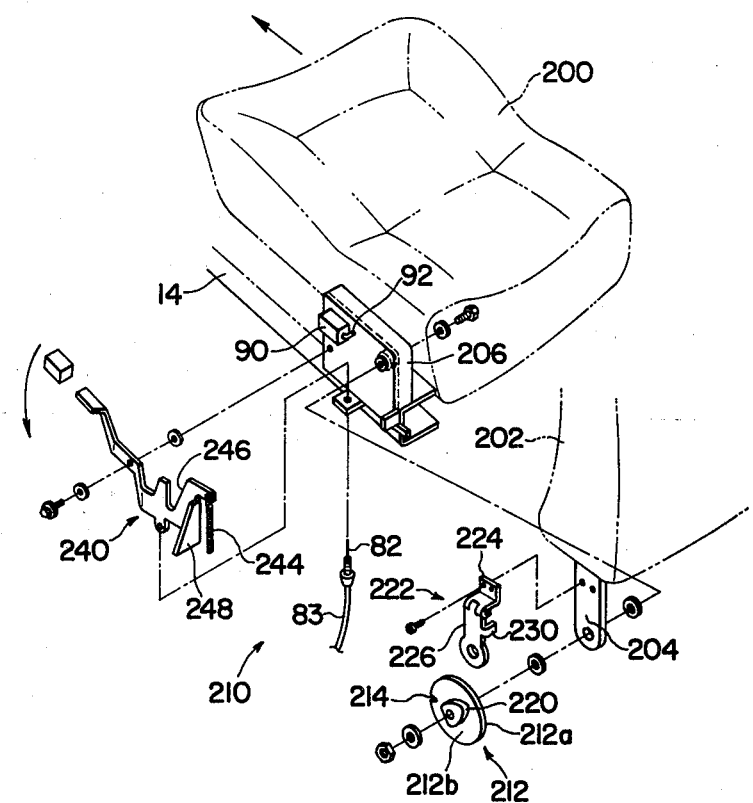
FIG. 5 is a perspective exploded view of the adjustable seat assembly according to another preferred embodiment of the invention.
Figure 6:
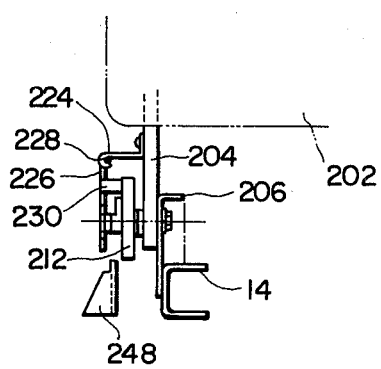
FIG. 6 is a side elevation partly in section of part of the embodiment in FIG. 5.
Figure 7:
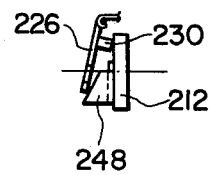
FIG. 7 is a view similar to FIG. 6 but showing the different state of operation.

Reference is now made to FIGS. 5 to 7 illustrating another preferred embodiment in which the position memory according to the invention is applied to the adjustable seat assembly with a tiltable backrest.

The seat assembly conventionally comprises a horizontal seat cushion 200 and a backrest 202 which is by its brace 204 hingedly mounted on a bracket 206 fixed to one of the slide rails 14.

Generally represented by 210 is a position memory specifically constructed for this embodiment in a manner described below. The memory comprises a rotary wheel 212 rotatably mounted on the brace 204. The wheel 212 has a recess 214 at its outer periphery 212a and a cam 220 integrally mounted on its outer surface 212b in a manner as in the previously mentioned embodiment. Denoted by 222 is a stop member which consists of a piece 224 fixedly bolted to the brace 204 and a piece 226 hinged at 228 to and depending from the piece 224. As best seen in FIG. 6, the piece 226 at its flange 230 engages with the outer surface 212b of the wheel 212, the engagement being held by spring or equivalent (not shown) for cooperation of the wheel with the brace 204.

The memory switch 90 is herein mounted on the bracket 206 and has a pivotal lever 92 engageable with the recess 214 of the wheel 212 in a similar manner as in the first embodiment.

Outboard of the seat 200 located is a manually operable lever 240 rockably mounted on a pivot pin 242. The rear end of the lever 240 is loaded by a spring 244 for normally biasing the lever 240 in clockwise direction in FIG. 5 about the pivot pin 242. The lever 240 is further formed at its rear portion with a cam mating surface 246 of the same function as in the first embodiment and a wedge 248 of the shape illustrated.

The operation of the position memory according to this embodiment is hereinafter described. When in a certain angular position assumed by the backrest 202, the manual lever 240 is swung in the arrow-indicated direction in FIG. 5, about the pivot pin 242 against the spring 244, the wedge 248 enters the space between the wheel 212 and the piece 226 forcing the latter to hingedly move apart from the wheel 212. The flange 230 which has restrained rotation of the wheel 212 by spring action is then released from the wheel 212 for free rotation of the same relative to the brace 204. In the meantime, the cam 220 at its lobe engages the cam mating surface 246. By further swinging the lever 240 in the same direction, the flat cam surface is brought into tight contact with the cam mating surface to prevent cam 220 and the wheel 212 from rotation, as in the first embodiment. In this rest position of the wheel 212, the lever 92 falls into the recess 214 at the periphery 212 of the wheel opening the switch 90.

The backrest 202 is then moved from this memory position to a desired forward or backward angular position. The electric drive mechanism and control circuit arrangements are generally the same as in the first embodiment, except that angular movement of the seat, instead of linear horizontal movement, is accomplished. With this angular movement of the backrest 202, the wheel 212 is rotated together with brace 204 by virtue of its pressure contact with the piece 226. The lever 92 then disengages from the recess 214 and is tilted in a direction dependent on the direction of rotation of the wheel. Subsequent tilting movement of the backrest is terminated by opening the auto-manual selection switch.

When now the auto-manual selection switch is again changed over to reinstate the memory position, the wheel 212 rotates together with the brace 204 by engagement with means of the stop member 222. The lever 92 thus snaps into the recess 214 in that memory position so that the switch 90 opens to stop the motor 30. Restoration of the backrest 202 to the memory position is thus completed.

The foregoing explanation has been made for the case in which the memory system is applied separately to horizontally movable seat and tiltable backrest. It would however be readily understood that the two embodiments in combination can be advantageously employed for a combined linear and swinging adjusting movement of a seat assembly. This may particularly be required in front seat assemblies for two-door type vehicles which are bodily displaceable for passengers' easy entrance into rear seats as referred to previously.

What is claimed is:

1. Position memory for an adjustable seat assembly having at least one adjustable movable seat member, comprising:
   drive means for driving the seat member for the adjusting movement thereof,
   a rotary wheel member engageable with a stationary surface for rotation with the adjusting movement of the seat member while being freely rotatable relative to the stationary surface when disengaged and having a recess formed at the periphery thereof,
   biasing means to engage said wheel member with the stationary surface,
   first operating means for bringing said wheel member out of engagement with said stationary surface for free rotation relative to the seat member, said first operating means including a pivotal member carried by said seat member and pivotally movable to allow free rotation of the wheel and a manually operable lever operatively connected with said pivotal member for pivotal movement thereof,
   second operating means for providing said wheel member with an angular rest position under a condition wherein said wheel member is disengaged from said stationary member, said second operating means including a cam member integrally mounted on said rotary wheel member and having a cam surface, and a cam mating surface which is engageable with said cam surface to bring said wheel member into said angular rest position, and
   switch means having a contact element in constant engagement with the periphery of said wheel member and engageable in said recess in the rest position of the wheel member to open said switch means.

2. Position memory according to claim 1, in which said drive means comprises an electric motor, and in which said switch means comprises an electric toggle switch and said contact element comprises a lever hinged to the body of said toggle switch.

3. Position memory for an adjustable seat assembly having two spaced stationary guide rails, two spaced slide rails slidably carried on said guide rails for back and forth adjusting movement, a horizontal seat member fixedly mounted on said slide rails, and drive means for driving the slide rails for adjusting movement thereof, comprising a rocker arm pivotally carried by one of said slide rails and extending generally in parallel with the same,
- a rotary wheel member rotatably carried by the free end of said rocker arm and engageable with and disengageable from one guide rail in dependence on swinging movement of the rocker arm, said wheel member having a recess formed at the periphery thereof,
- means biasing said wheel member into friction engagement with said one guide rail for rotation with the back and forth movement of the slide rails,
- a manually operable means for swinging said rocker arm out of engagement with said one guide rail against said biasing means,
- means providing an angular rest position of said wheel member, and
- a toggle switch mounted on said rocker arm and having a lever pivotally carried by the body of said switch and in constant engagement with the periphery of said wheel member and engageable in said recess in the rest position of said wheel member.

4. Position memory according to claim 3, in which said manually operable means comprises a pivotal lever mounted on the outboard side of said seat member and an operating cable connected between said pivotal lever and said rocker arm to exert a pulling force upon said rocker arm in dependence on pivotal movement of said pivotal lever.

5. Position memory according to claim 4, further comprising auxiliary means for biasing said rocker arm to urge said wheel member in a direction away from said one guide rail.

6. Position memory according to claim 5, further comprising stop means for limiting the pulling force exerted on said rocker arm through said operating cable.

7. Position memory according to claim 3, in which said manually operable means comprises a lever integrally extending rearward from said rocker arm.

8. Position memory according to claim 3, in which said means providing a rest position comprises a cam member fixedly mounted on said wheel member and having a cam surface of a predetermined shape, and a cam mating surface fixedly carried by a bracket extending from one slide rail, said cam mating surface being engageable with said cam surface to bring said wheel member to said rest position.

9. A combination comprising
- at least one adjustably movable seat support member slidable along a guide member,
- at least one seat member supported on said seat support member,
- a drive motor having two opposite drive directions,
- control means for controlling the drive action and direction of said drive motor, said control means including means for selection between automatic and manual adjustment and producing a signal representing the selected one of adjustment, and means for selection between the two opposite directions of the adjusting movement of the seat member,
- means transferring the drive action of the drive motor to said seat support member,
- a position memory for automatic return to the initially set position of the seat support member after any adjusting movement thereof, comprising
- a rotary wheel member engageable with said guide member for rotation with the adjusting movement of the support member while being freely rotatable relative to the same when disengaged and having a recess formed at the periphery thereof,
- means biasing said wheel member into engagement with the guide member,
- operating means for bringing said rotary wheel member out of engagement with said guide member for free rotation relative to the same,
- means providing an angular rest position of said wheel member, and
- switch means operatively connected with said control means and having a contact element in constant engagement with the periphery of said wheel member and engageable in said recess in said rest position of the wheel member to open said switch means.

* * * * *